US012375759B2

(12) United States Patent
Emmanuel et al.

(10) Patent No.: US 12,375,759 B2
(45) Date of Patent: *Jul. 29, 2025

(54) SYSTEMS AND METHODS TO PREVENT OR REDUCE AD FATIGUE USING USER PREFERENCES

(71) Applicant: Adeia Guides Inc., San Jose, CA (US)

(72) Inventors: Daina Emmanuel, Bangalore (IN); Padmassri Chandrashekar, Karnataka (IN)

(73) Assignee: Adeia Guides Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/205,138

(22) Filed: Jun. 2, 2023

(65) Prior Publication Data

US 2023/0328314 A1 Oct. 12, 2023

Related U.S. Application Data

(63) Continuation of application No. 17/358,294, filed on Jun. 25, 2021, now Pat. No. 11,706,486.

(51) Int. Cl.
*H04N 21/44* (2011.01)
*H04N 21/442* (2011.01)
*H04N 21/45* (2011.01)
*H04N 21/466* (2011.01)
*H04N 21/81* (2011.01)

(52) U.S. Cl.
CPC ... *H04N 21/44204* (2013.01); *H04N 21/4532* (2013.01); *H04N 21/4667* (2013.01); *H04N 21/812* (2013.01)

(58) Field of Classification Search
CPC ........ H04N 21/44204; H04N 21/4532; H04N 21/4667; H04N 21/812
See application file for complete search history.

(56) References Cited

U.S. PATENT DOCUMENTS

| | | | |
|---|---|---|---|
| 6,490,722 B1* | 12/2002 | Barton | H04N 9/8042 348/E5.103 |
| 7,761,892 B2 | 7/2010 | Ellis et al. | |
| D677,069 S * | 3/2013 | Adams, IV | D6/370 |
| 9,226,042 B1* | 12/2015 | Kramer | H04N 21/235 |
| 10,154,319 B1 | 12/2018 | Ramakrishnan et al. | |
| 11,706,486 B2 | 7/2023 | Emmanuel et al. | |
| 2002/0120925 A1* | 8/2002 | Logan | A61Q 19/00 725/135 |
| 2004/0133909 A1* | 7/2004 | Ma | H04N 21/2668 348/E7.071 |
| 2004/0268387 A1* | 12/2004 | Wendling | H04N 5/445 725/35 |

(Continued)

OTHER PUBLICATIONS

"International Search Report and Written Opinion", Int'l. App. No. PCT/US2021/064290, 15 pages.
(Continued)

*Primary Examiner* — Timothy R Newlin
(74) *Attorney, Agent, or Firm* — Haley Guiliano LLP

(57) ABSTRACT

The present disclosure relates to reducing or preventing ad fatigue in a user by determining the preference of a user to an ad, in particular user preference for parameters such as video track, audio track, dialogue or tone. The disclosure also relates to the provision of a timer that prevents an ad being shown repeatedly within a predetermined time frame.

8 Claims, 8 Drawing Sheets

(56) References Cited

U.S. PATENT DOCUMENTS

| | | | |
|---|---|---|---|
| 2007/0016918 A1* | 1/2007 | Alcorn | H04M 3/42221 725/18 |
| 2008/0092159 A1* | 4/2008 | Dmitriev | H04N 21/2407 725/35 |
| 2008/0092182 A1* | 4/2008 | Conant | H04N 21/2543 348/E7.071 |
| 2008/0155585 A1* | 6/2008 | Craner | H04N 5/76 725/32 |
| 2008/0307481 A1* | 12/2008 | Panje | H04N 21/4788 725/119 |
| 2009/0007195 A1* | 1/2009 | Beyabani | H04N 21/8456 725/86 |
| 2009/0210300 A1* | 8/2009 | Cansler | G06Q 30/02 705/14.61 |
| 2009/0300672 A1* | 12/2009 | Van Gulik | H04N 21/632 725/31 |
| 2010/0088716 A1* | 4/2010 | Ellanti | H04N 21/41415 386/241 |
| 2010/0251289 A1* | 9/2010 | Agarwal | H04N 21/458 725/34 |
| 2010/0269128 A1* | 10/2010 | Gordon | H04N 21/4722 725/25 |
| 2010/0280876 A1* | 11/2010 | Bowra | G06Q 30/0251 705/14.69 |
| 2012/0005313 A1* | 1/2012 | McGowan | G06F 16/41 709/219 |
| 2012/0233631 A1* | 9/2012 | Geshwind | H04N 21/44016 725/35 |
| 2013/0111510 A1* | 5/2013 | Baker | H04N 21/4784 725/13 |
| 2014/0003648 A1* | 1/2014 | Fedorovskaya | G06Q 50/01 382/100 |
| 2014/0033240 A1* | 1/2014 | Card, II | H04N 21/4667 725/14 |
| 2015/0026708 A1* | 1/2015 | Ahmed | H04N 21/812 725/12 |
| 2015/0052549 A1* | 2/2015 | Teixeira | H04N 21/6587 725/32 |
| 2015/0304698 A1* | 10/2015 | Redol | G06Q 30/00 725/23 |
| 2015/0358689 A1* | 12/2015 | Wen | H04N 21/4331 725/32 |
| 2015/0373379 A1* | 12/2015 | Chandrashekar | H04N 19/70 375/240.03 |
| 2016/0065999 A1* | 3/2016 | Chesluk | H04N 21/6543 725/28 |
| 2016/0314404 A1* | 10/2016 | Carmichael | G06F 16/435 |
| 2017/0179219 A1 | 6/2017 | Ishizaka et al. | |
| 2017/0195745 A1* | 7/2017 | Kumar Bvn | H04N 21/2387 |
| 2019/0149879 A1 | 5/2019 | Siddiq et al. | |
| 2019/0342607 A1* | 11/2019 | Major | H04N 21/4821 |
| 2021/0144426 A1* | 5/2021 | Navarre | H04N 21/23424 |
| 2021/0204025 A1* | 7/2021 | Patel | H04N 21/4825 |
| 2022/0417592 A1 | 12/2022 | Emmanuel et al. | |

OTHER PUBLICATIONS

Oosterwechel, Jurre, "The relationship between advertising preference accuracy and consumer engagement in social media advertising", URL: https://www.semanticscholar.org/paper/The-relationship-between-advertising-preference-and-Oosterwechel/7b904ab433c98061470cbcf1fbd9d2d9ca0b8445?p2df, Feb. 19, 2018, 1-69.

* cited by examiner

| 601 | 602 | 603 | 604 | 605 | 606 | 607 |
|---|---|---|---|---|---|---|
| Media Asset | First Ad | Media Asset Cont. | Second Ad | Media Asset Cont. | Third Ad | Media Asset Cont. |

FIG. 6A

| 609 | 608 | 609 | 611 | 610 | 611 |
|---|---|---|---|---|---|
| First Media Asset | First Ad | First Media Asset Cont. | Second Ad | Second Media Asset | Second Media Asset Cont. |

FIG. 6B

Day 1

| 614 | 612 | 614 |
|---|---|---|
| First Media Asset | First Ad | First Media Asset Cont. |

Day 2

| 615 | 613 | 615 |
|---|---|---|
| Second Media Asset | Second Ad | Second Media Asset Cont. |

FIG. 6C

SYSTEMS AND METHODS TO PREVENT OR REDUCE AD FATIGUE USING USER PREFERENCES

CROSS-REFERENCE TO RELATED APPLICATION

This application is a continuation of U.S. patent application Ser. No. 17/358,294 filed Jun. 25, 2021, which is hereby incorporated by reference herein in its entirety.

FIELD

The present disclosure relates to reducing or preventing ad fatigue in a user by determining the preference of the user to an advertisement, in particular user preference for parameters such as video track, audio track, dialogue or tone. The disclosure also relates to the provision of a timer that prevents an ad being shown repeatedly within a predetermined time frame.

BACKGROUND

For decades, brand and product owners have used media consumed by the public as a platform for advertising their products and services. With the widespread consumption of media over different platforms, such as television, on demand TV, catch-up TV and social media, such as Facebook or Instagram, YouTube etc., there are multiple platforms on which a media user will view ads. This can result in a user being overwhelmed, or even fed up with and tired of seeing the same ads over and over again, and skipping the ones they no longer want to view.

"Ad fatigue" is a well-known concept with both media consumers and media advertisers. It is an issue that can affect even the most successful, creative and popular ads. Ad fatigue usually occurs when the frequency at which an ad is shown becomes too high meaning the target audience sees the same ads again and again, and often across many different media platforms, and becomes less responsive to them.

Furthermore, no matter how creative or expensive the process to make an ad has been, it will still only be attractive to a certain number of users, usually within a certain demographic. Certain products may need to be advertised in different ways to engage with different demographics of the population, and multiple ads can be expensive to produce. Moreover, showing different ads for the same product can lead to ad fatigue, even though each ad is itself different; the user may tire of seeing the same product again and again, regardless of the different ways in which it may be advertised.

Various ways of combatting ad fatigue have been mooted. These range from changing the background of an ad to showing a large number of different ads on rotation to merely reducing the frequency of the ad being shown to a user. However, each of these remains susceptible to either ad fatigue or to becoming ineffective.

The present disclosure is concerned with addressing the issue of ad fatigue while maintaining the effectiveness of an ad. It has been traditionally thought that more times a user is shown the same ad over several different media platforms, such as TV, numerous social media platforms, pay-per-view programs, etc., the more likely the user is to be influenced by that ad. However, the inventors have found that specifically tailoring an ad to the user preferences is more effective. This may also be combined with limited viewing of the preferred ad to limit the exposure of a user to an ad within a certain time period in order to combat ad fatigue.

SUMMARY

The present invention relates to a method for reducing or preventing ad fatigue.

A user of a media device may be consuming media, such as the television show MASTERCHEF. This show runs weekly over several weeks, and each episode is around one hour long. The episode may be split into four sections, each interrupted by an ad break, wherein several (maybe 5, 6, 7 or 8) ads may be shown. During the first ad break the user may view all ads that are displayed. After the next section of MASTERCHEF, the second ad break may be displayed, and some of the ads within the break may be the same as the ones displayed during the first ad break. The user may not wish to view the same ad again so soon, and may therefore skip the ad(s) that they have already seen. Alternatively, particularly if the MASTERCHEF episode is being viewed in real time, rather than later using a "catch up" process, if the ad cannot be skipped, the user may change channel for the duration of an individual ad or the whole ad break. This may be considered the same as skipping an ad, because the user does not want to view the ad. To reduce or prevent the chance of the user skipping or changing channel such that they do not view the ad, a user profile can be retrieved by the media guidance application, such that certain parameters are chosen which are determined to be preferred by the user. For example, an ad for a kitchen supplier may be shown. The video image of the ad may be of a traditional family of two parents and two children. One parent and two children may be laughing and smiling at the kitchen table as the other parent cooks and serves a delicious looking meal. There may be dialogue between the actors playing the roles of the family members indicating that they really enjoy being in their new kitchen, and music that is uplifting and that creates a mood of joy and calm. There may also be a voiceover track that states that a new kitchen from the advertised supplier ensures happy family times. The user may watch just a few seconds of the ad before skipping it. The application may determine from the user profile that the user is not likely to have children, and in the next ad break, or a subsequent ad break, the same kitchen supplier may be advertised, but this time a video image may be of a group of young people having a party and enjoying drinks in a kitchen. The music may be high energy party music and the dialogue may be between actors about how much they love the new kitchen space for socializing. The user may watch this ad and the user profile may be updated accordingly.

Separately, at a different time, the user may be browsing YouTube and viewing video content therein. The user may be watching a video on how to apply eye makeup, such as a video featuring makeup artist Lisa Potter Dixon, and the video entitled "How to Apply Mascara." The video may be interrupted to show an ad for a cruise vacation. The ad may show views of tropical looking seas, white sands, and sunny skies, and views within the cruise ship of swimming pools, restaurants and a casino, followed by a view of the huge cruise ship from a distance. There may be groups of middle aged people talking together, eating and drinking, and sitting relaxing by the swimming pool. The music may be a track from the 70s or 80s, such as Wham's "Club Tropicana". The user may stop viewing this ad after a few seconds, either by skipping or changing channel and the ad may then be considered to be skipped. In a subsequent interruption of the media asset, the same cruise company may be advertising its vacations but the video image may be of younger people dancing in an on-board night club, drinking cocktails by the swimming pool and laughing and playing in the ocean. The music track may be "Sunrise Over the Bay", by Markus Schulz. The user may view the ad having this different set of parameters.

In the future, maybe two days later, when the user is watching a TV show using TV on demand, the media guidance application may generate an ad for toothpaste. The user may be watching an old episode of DANCING ON ICE. Based on the updated user profile, the episode of DANCING ON ICE may be interrupted by an ad generated for a toothpaste. The ad may display a video track of a group of young people in their 20s, smiling and showing white teeth. The music track may be a high energy dance music track. The video track may cut to one of the people getting ready to go out, cleaning their teeth and smiling into the mirror showing white straight clean shiny teeth. The video may cut back to the group of people dancing, focusing on the person who was earlier shown cleaning their teeth, attracting a lot of attention. There may be a voiceover but no dialogue. The user may view this ad in its entirety because it has a set of parameters that match the parameters of the preferred ads previously displayed and viewed by the user.

The media guidance application may determine, before the user views any ad, what the user's preferences are, based on the user profile of previously viewed media assets. For example, when the user begins to watch a media asset, the media guidance application, upon reviewing the user profile, may determine that the user has previously viewed LOVE ISLAND, JERSEY SHORE and REAL HOUSEWIVES OF BEVERLY HILLS. The media guidance application may therefore determine that the preferred set of parameters should not include a video track featuring retired people, music older than 2000, and the voiceover and/or dialogue should create a perception of fun and partying, rather than be serious and formal in tone.

However, it may be that the user, although preferring light-hearted reality TV shows, prefers factual ads. In such a case, the toothpaste ad described above may be skipped. In this case, the media guidance application may interrupt the TV show and generate an ad for the same toothpaste, but instead of the partying scene within the ad, it may show a video of the person at the dentist and have a dialogue track between the patient and the dentist about fluoride content of toothpaste, and the percent of people who see a difference in the whiteness of their teeth after using the toothpaste for a prescribed length of time. The user may view more than fifty percent, or more than the threshold for determining the ad is viewed for this ad, and the user profile may be updated accordingly.

The present disclosure also contemplates ensuring the same ad having a given set of parameters is not shown again within a predetermined time period. The time period may be a set time, such as one day, one week or it may be set as the time when a certain number of ads having different parameters have been shown, such as after 50 ads have been displayed, the ad with the original set of parameters may again be displayed. For example, the user may watch eight hours of media back-to-back, and therefore the wait period for ad having the set of parameters that triggered the onset of the timer may expire during that time, because scores of ads would be displayed during eight hours of media consumption.

BRIEF DESCRIPTION OF THE DRAWINGS

The above and other objects and advantages of the disclosure will be apparent upon consideration of the following detailed description, taken in conjunction with the accompanying drawings, in which:

FIGS. 6A, 6B and 6C depict diagrams of different time points within a media asset at which ads may be displayed;

Figure 1:
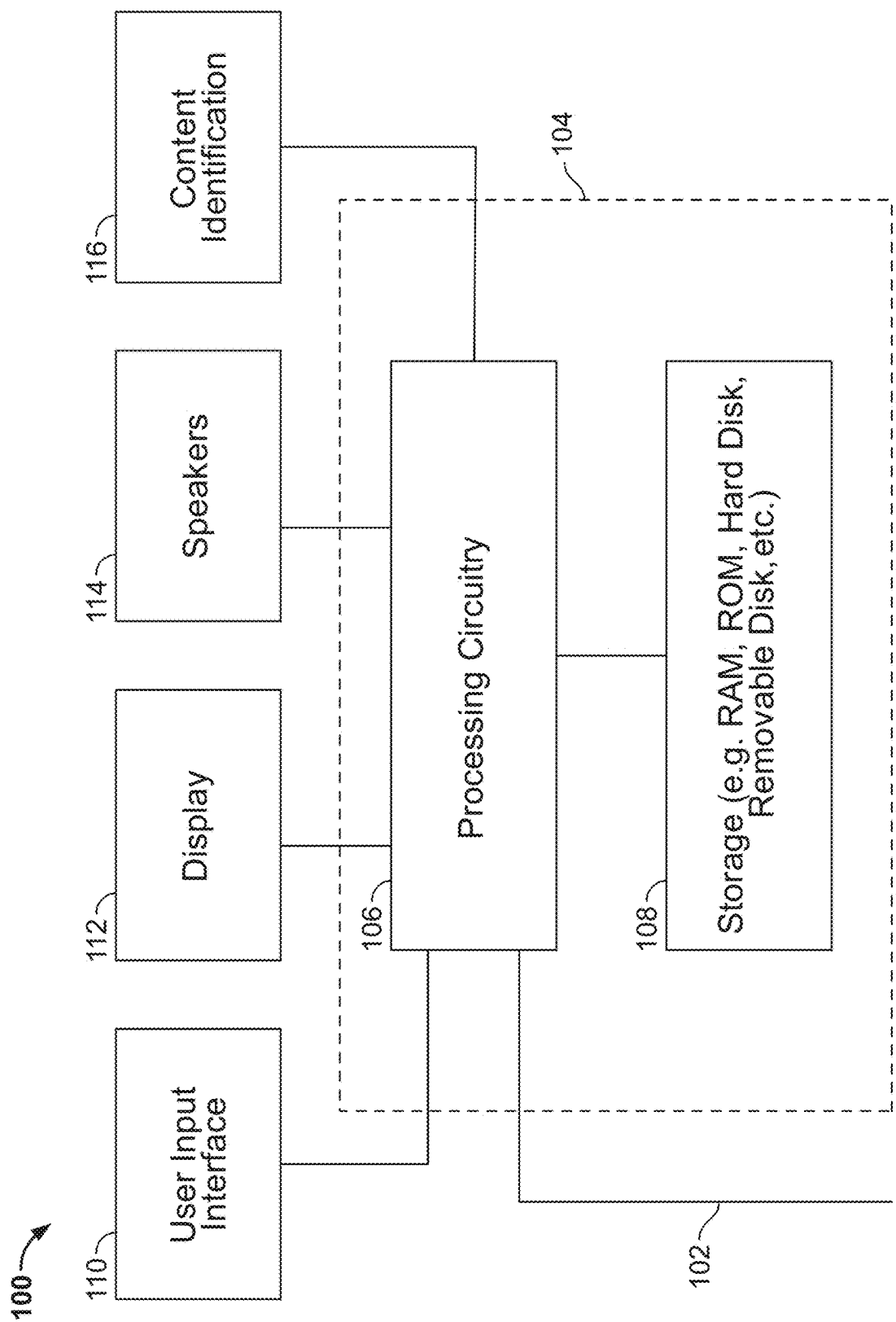
FIG. 1 shows an illustrative depiction of an example user device, in accordance with some embodiments of the present disclosure.

The figures herein depict various embodiments of the disclosures invention for purposes of illustration only. It will be appreciated that additional or alternative structures, systems and methods may be implemented within the principles set out by the present disclosure.

DETAILED DESCRIPTION

As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.,), media format (e.g., standard definition, high definition, 3D, etc.), ad information (e.g., text, images, media clips, etc.), on-demand information, blogs, websites, and any other type of guidance data that is helpful for a user to navigate among and locate desired content selections.

As referred to herein, the terms "media asset" and "media content" should be understood to mean an electronically consumable user asset, such as a live televise program, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, ads, chat sessions, social media, applications, games, and/or any other media or multimedia and/or combination of the same. Guidance applications also allow users to navigate and locate content.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Users may access content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive content and data via input/output (hereinafter "I/O") path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media guidance application stored in memory (i.e., storage 108). Specifically, control circuitry 104 may be instructed by the media guidance application to perform the functions discussed above and below. For example, the media guidance application may provide instructions to control circuitry 104 to generate the media guidance displays. In some implementations, any action performed by control circuitry 104 may be based on instructions received from the media guidance application.

In client-server based embodiments, control circuitry 104 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other.

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the user equipment 100. Circuitry 104 may also include digital-to-analog converter circuitry and analog-to-digital converter circuitry for converting between digital and analog signals.

The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touchscreen, touchpad, stylus input, joystick, voice recognition interface, or other user input interfaces.

Display 112 may be provided as a stand-alone device or integrated with other elements of user equipment device 100. For example, display 112 may be a touchscreen or touch-sensitive display. In such circumstances, user input interface 112 may be integrated with or combined with display 112. Display 112 may be one or more of a monitor, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media guidance application and any suitable content may be displayed in 3D. A video card or graphics card may generate the output to the display 112. The video card may offer various functions such as accelerated rendering of 3D scenes and 2D graphics, MPEGS 2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of user equipment device 100 or may be stand-alone units. The audio component of videos and other content displayed on display 112 may be played through speakers 114. In some embodiments, the audio may be distributed to a receiver (not shown), which processes and outputs the audio via speakers 114. User equipment device 100 may also incorporate or be accessible to one or more other modules 116. For example, a content identification module 116 for identifying visual content, for example.

The media guidance application may be implemented using any suitable architecture. For example, it may be a stand-alone application wholly-implemented on user equipment device 100. In such an approach, instructions of the application are stored locally (e.g., in storage 108), and data for use by the application is downloaded on a periodic basis (e.g., from an out-of-band feed, from an Internet resource, or using another suitable approach). Control circuitry 104 may retrieve instructions of the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media guidance application is a client-server based application. Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below.

The client device may receive the displays generated by the remote server and may display the content of the displays locally on equipment device 100. This way, the processing of the instructions is performed remotely by the server while the resulting displays are provided locally on equipment device 100. Equipment device 100 may receive inputs from the user via input interface 110 and transmit those inputs to the remote server for processing and generating the corresponding displays. For example, equipment device 100 may transmit a communication to the remote server indicating that an up/down button was selected via input interface 110. The remote server may process instructions in accordance with that input and generate a display of the application corresponding to the input (e.g., a display that moves using a cursor up/down). The generated display is then transmitted to equipment device 100 for presentation to the user.

In some embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be an EBIF application. In some embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
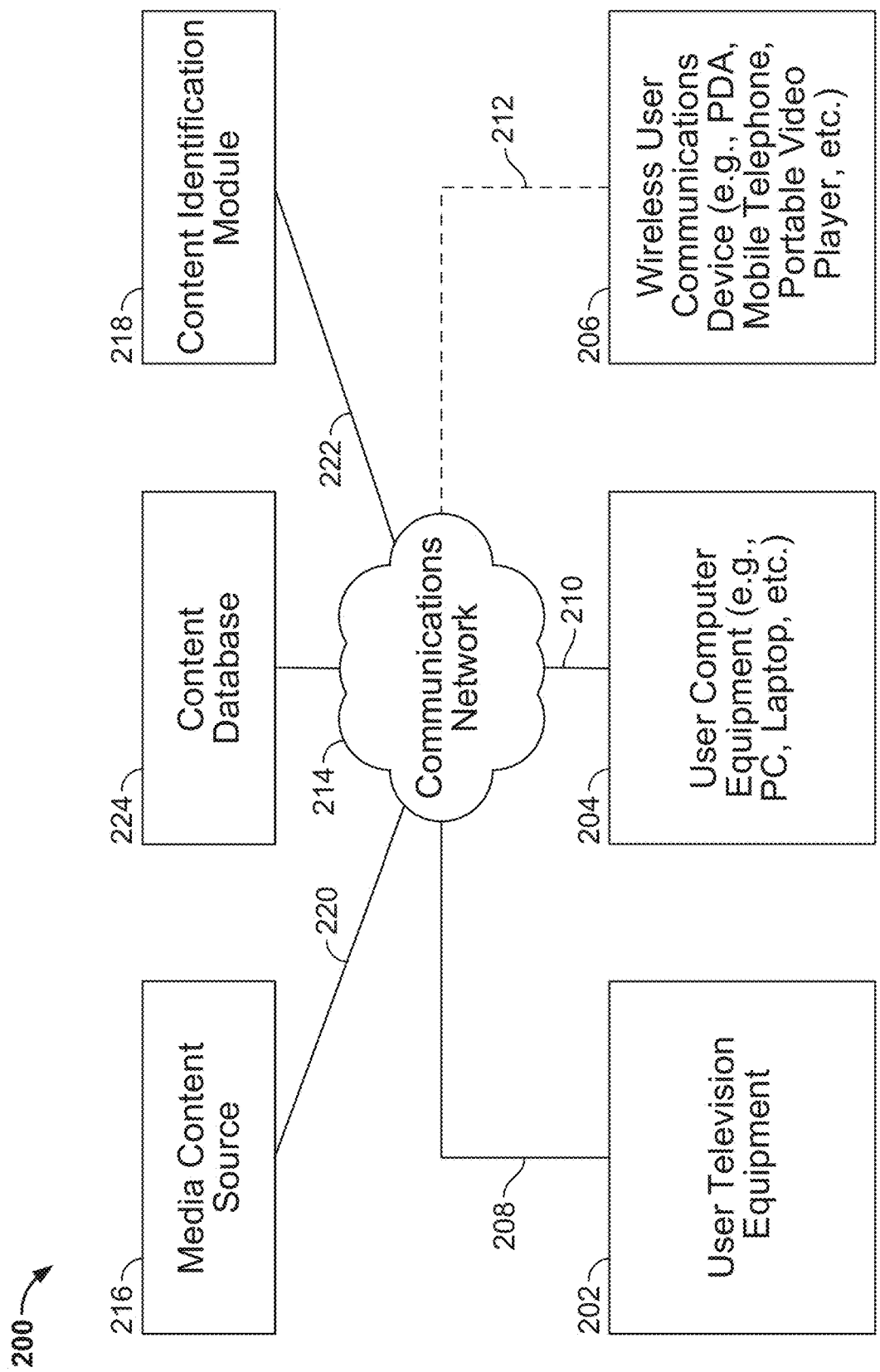
FIG. 2 shows a block diagram of an illustrative user equipment system, in accordance with some embodiments of the present disclosure.

User equipment device 100 of FIG. 1 can be implemented in system 200 of FIG. 2 as user television equipment 202, user computer equipment 204, wireless user communications device 206, or any other type of user equipment suitable for accessing content. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 1 may not be classified solely as user television equipment 202, user computer equipment 204, or a wireless user communications device 206. For example, user television equipment 202 may, like some user computer equipment 204, be Internet-enabled allowing for access to Internet content, while user computer equipment 204 may, like some television equipment 202, include a tuner allowing for access to television programming. The media guidance application may have the same layout on various different types of user equipment or may be tailored to the display capabilities of the user equipment. For example, on user computer equipment 204, the guidance application may be provided as a web site accessed by a web browser. In another example, the guidance application may be scaled down for wireless user communications devices 206.

In system 200, there may be more than one of each type of user equipment device but only one of each is shown in FIG. 2 to avoid overcomplicating the drawing. In addition, each user may utilize more than one type of user equipment device and also more than one of each type of user equipment device. In some embodiments, a user equipment device (e.g., user television equipment 202, user computer equipment 204, wireless user communications device 206) may be referred to as a "second screen device" or "secondary device".

The user may also set various settings to maintain consistent media guidance application settings, e.g., volume settings, across in-home devices and remote devices. Settings include programming preferences that the guidance application utilizes to make programming recommendations, display preferences, and other desirable guidance settings. For example, if a user sets a preferred volume level as a favorite volume level on, for example, a web site mobile phone, the same settings would appear on the user's in-home devices (e.g., user television equipment and user computer equipment), if desired. Therefore, changes made on one user equipment device can change the guidance experience on another user equipment device, regardless of whether they are the same or a different type of user equipment device.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile voice or data network (e.g., a 4G or LTE network), cable network, public switched telephone network, or other types of communications network or combinations of communications networks. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes content source 216 and media guidance data source 218 coupled to communications network 214 via communication paths 220 and 222, respectively. Paths 220 and 222 may include any of the communication paths described above in connection with paths 208, 210, and 212. Communications with the content source 216 and media guidance data source 218 may be exchanged over one or more communications paths, but are shown as a single path in FIG. 2 to avoid overcomplicating the drawing. In addition, there may be more than one of each of content source 216 and media guidance data source 218, but only one of each is shown in FIG. 2 to avoid overcomplicating the drawing. (The different types of each of these sources are discussed below.) If desired, content source 216 and media guidance data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Content source 216 may include one or more types of content distribution equipment including a television distribution facility, cable system headend, satellite distribution facility, programming sources (e.g., television broadcasters, such as NBC, ABC, HBO, etc.,), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 216 may be the originator of content (e.g., a television broadcaster, a Webcast provider, etc.,) or may not be the originator of content (e.g., an on-demand content provider, an Internet provider of content of broadcast programs for downloading, etc.,). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Media guidance applications may be, for example, standalone applications implemented on user equipment devices. For example, the media guidance application may be implemented as software or a set of executable instructions which may be stored in storage 108, and executed by control circuitry 104 of a user equipment device 100. In some embodiments, media guidance applications may be client-server applications where only a client application resides on the user equipment device, and server application resides on a remote server. For example, media guidance applications may be implemented partially as a client application on control circuitry 104 of user equipment device 100 and partially on a remote server as a server application (e.g., media guidance data source 218) running on control circuitry of the remote server. When executed by control circuitry of the remote server (such as media guidance data source 218), the media guidance application may instruct the control circuitry to generate the guidance application displays and transmit the generated displays to the user equipment devices. The server application may instruct the control circuitry of the media guidance data source 218 to transmit data for storage on the user equipment. The client application may instruct control circuitry of the receiving user equipment to generate the guidance application displays.

Content and/or media guidance data delivered to user equipment devices 202, 204, and 206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT. In addition to content and/or media guidance data, providers of OTT content can distribute media guidance applications (e.g., web-based applications or cloud-based applications), or the content can be displayed by media guidance applications stored on the user equipment device.

Media guidance system 200 is intended to illustrate various approaches, or network configurations, by which user equipment devices and sources of content and guidance data may communicate with each other for the purpose of accessing content and providing media guidance. The embodiments described herein may be applied in any approach that does not deviate from the teachings of this disclosure, for example in a system employing an approach for delivering content and providing media guidance.

In an example approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216 and one or more media guidance data sources 218. In addition or in the alternative, the remote computing sites may include other user equipment devices, such as user television equipment 202, user computer equipment 204, and wireless user communications device 206. For example, the other user equipment devices may provide access to a stored copy of a video or a streamed video.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 1.

Figure 3:
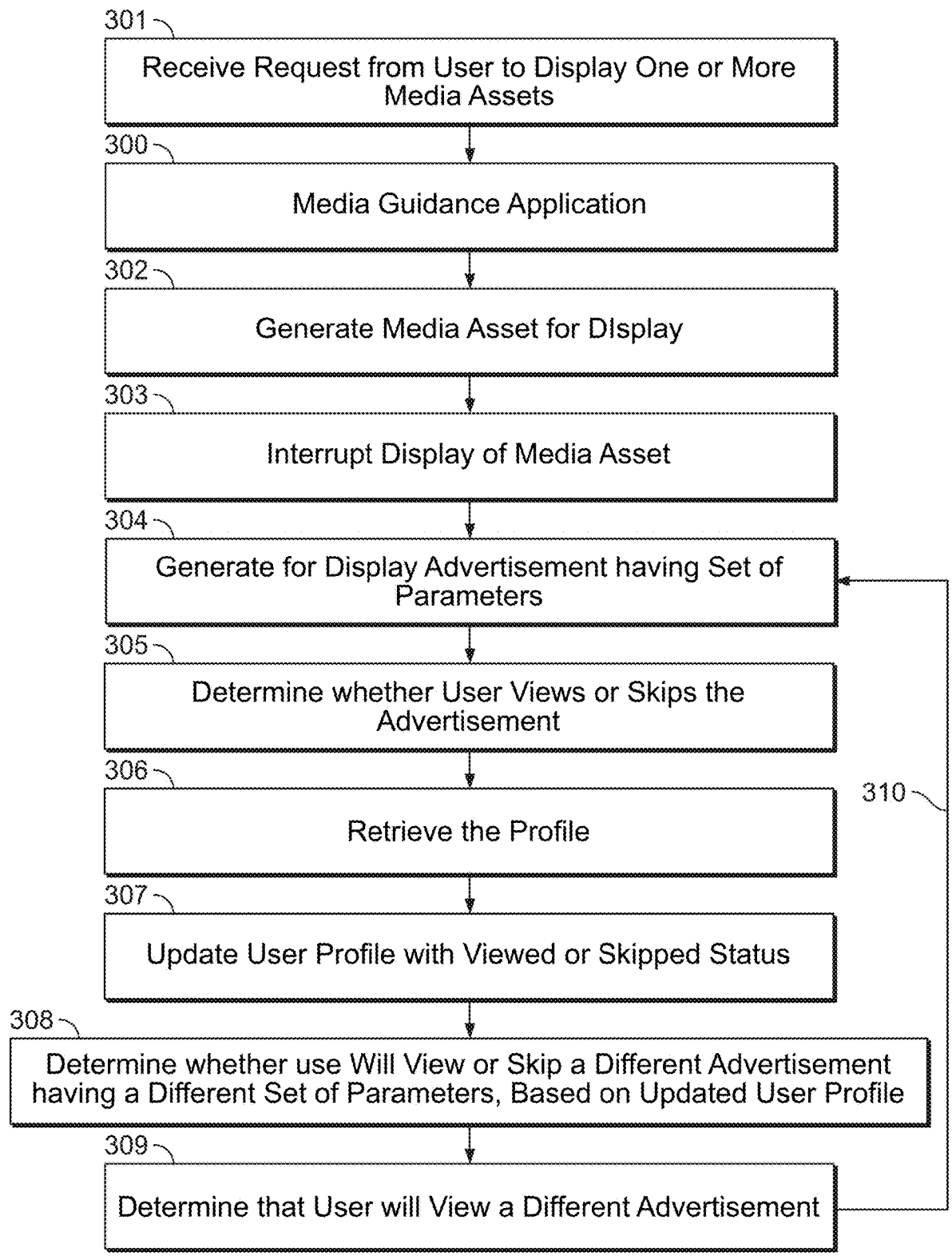
FIG. 3 depicts an illustrative flowchart of a process for reducing or preventing ad fatigue by determining user preferences for an ad.

The invention comprises a method to reduce or prevent ad fatigue. FIG. 3 shows an example of the claimed method comprising a media guidance application 300. At 301, the system receives a request from a user to display one or more media assets then generate a media asset for display 302. The media guidance application interrupts the display of the media asset 303 and generates for display an ad having a set of parameters 304. It is determined whether a user views or skips the first ad 305. The media guidance application retrieves a user profile 306 and updates the user profile with a viewed or skipped status for the ad 307. The next step exemplified is determining whether the user will watch or skip a different ad having a different set of parameters based on the updated user profile 308. If it is determined that the user will watch the second ad, the media guidance application will generate another ad having a set of parameters for display 310 and back to 304. The method may also comprise determining 305 whether the user views or skips another ad 304, retrieving the user profile 306; updating the user profile with a viewed or skipped status for another ad 307; determining whether a user will view or skip a further ad having a further set of parameters based on the updated user profile 308; and if it is determined that the user will watch the further ad, generating the further ad for display, 309 and 310 and returning back to 304. As exemplified in FIG. 3 the method of generating ads and determining whether each ad is viewed or skipped, may be continued until all combinations of parameters have been generated and displayed to the user.

The method may be continued until a preferred set of parameters is identified, i.e., a set of parameters that the user views and does not skip. In some embodiments, the media guidance application may determine the first set of parameters by basing them on stored user preference or on popularity with users with a similar profile. For example, the media guidance application may determine, from previous input from the user, that the first set of parameters will include a voiceover rather than dialogue between actors. In some embodiments, the media guidance application may determine the first set of parameters will include a high energy rock music track rather than a slower paced classical music track; the media guidance application may determine that the first set of parameters will include assertive words rather than suggestive words. Alternatively, in the absence of a user profile or in the absence of consent from the user to access their profile, the first ad having the first set of parameters may be determined and generated randomly.

The system of the present disclosure proposes an efficient way to reduce or prevent ad fatigue in a user, by changing certain parameters of an advert to match the user's preference. For example, a user may be displayed a first ad for e.g., a sailing vacation having parameters relating to fast paced rock music and dialogue with a high level of energy. The user may skip the first ad and the user profile updates accordingly. The second ad displayed may have the same video track of the sailing holiday but the second set of parameters may relate to gentle classical music and softly spoken dialogue, and the user may view the second ad.

Alternatively, the parameter relating to the video track may be different, although the second ad may relate to the same product as the first ad, e.g., a fitness tracker may be shown in the first ad as a sports accessory with a video of a person running. The user may skip the first ad and the user profile updated accordingly. The second ad may show the same fitness tracker but as a fashion accessory in a variety of colors, which ad may be viewed by the user. Therefore, the method of the invention allows the user profile to be updated with the information that the user skips the e.g., a slower gentle advert and watches the faster more energetic advert and uses this information when showing the same advert again. The information may also be used when showing the user future different ads.

The media guidance application may determine, from a user profile, preferences for the user unrelated to viewing or skipping an ads having a set of parameters in order to more quickly determine an ad with a set of parameters that the user will view. For example, the media guidance application may retrieve user preferences relating to a variety of activities, such as user's sports preferences, movie preferences, shopping preferences, etc.

The media guidance application may determine the user has a preference for, e.g., horror movies, and generate accordingly an ad having a set of parameters that comprises at least one parameter in common with a horror movie, e.g., an element of suspense.

The media guidance application may compare the parameters of a viewed ad with a user profile to determine parameters in common. For example, the media guidance application may compare the generated ad having a set of parameters (e.g., an ad about dog food) with the user profile showing preferences for shared memes on social media, e.g., the user's profile shows preferences for memes containing dogs and thus the generated ad having a set of parameters should have at least one parameter relating to dogs, such as a video parameter.

In some embodiments, the first set of parameters and the second set of parameters are selected from a plurality of sets of parameters and, in some embodiments, the first ad and second ad have different sets of parameters. For a first and a second ad having a first and a second set of parameters, respectively, all parameters between sets of parameters are different, i.e., the ad is for a different product, with different music, dialogue etc. Or it may be that the product being advertised is the same but one or more or all of the video, audio, dialogue etc., parameters are different.

The first set of parameters and the second set of parameters may differ by one parameter, or by more than one parameter.

In some embodiments, once the second ad has been generated for display, it is determined whether the user views or skips the second ad and the user profile is updated with a viewed or skipped status for the second ad, and the media guidance application determines whether the user will view or skip and further ad having a further set of parameters. If it is determined that the user will view the further ad, the further ad is generated for display.

Figure 4:
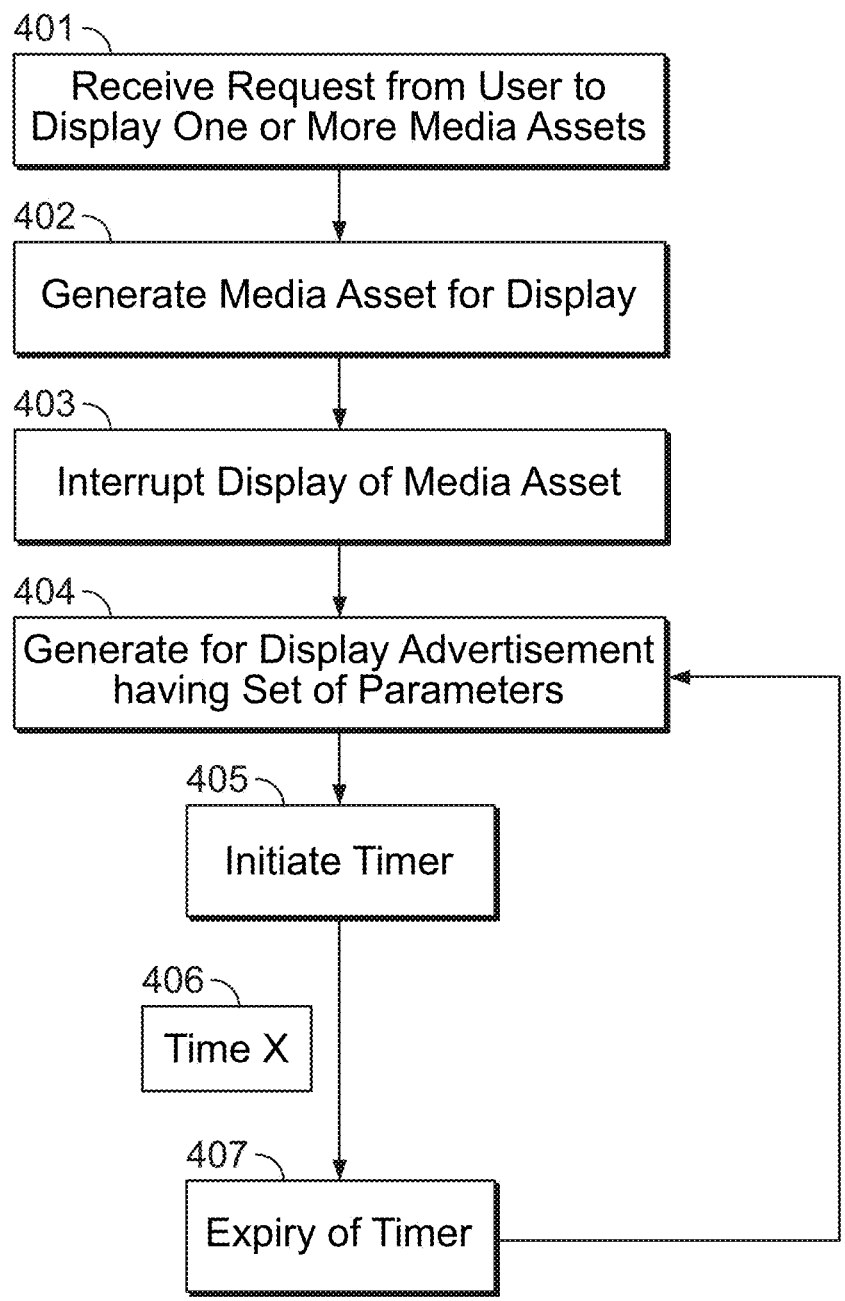
FIG. 4 depicts an illustrative flowchart of a process for ensuring an ad is not displayed too frequently.

FIG. 4 shows an example of the method of the invention which may comprise the step of, after receiving a request from a user to display one or more media assets 401, and generating a media asset for display 402, interrupting the display of the media asset 403 and generating for display an ad having a set of parameters 404, initiating a timer 405 which runs for a predetermined time period (time x; 406), and the ad may be generated again 406 only after the expiry, at 407, of the timer. The timer may relate to at least one media platform or to all media platforms. The timer may be initiated upon generation of the first and/or second and/or further ad to help reduce or prevent ad fatigue by ensuring the same ad having the same set of parameters is not displayed again to the user too soon. The user, even if they have viewed an ad in its entirety may soon lose interest in it and skip it if the ad is displayed to the user too frequently or within too short a time frame after the ad was last displayed.

The disclosure also contemplates, once a set of parameters has been determined as being preferred by the user, a timer that is initiated, which prevents the same advert from appearing again within a predetermined time period. Even though the advert may be watched and preferred by the user, limiting the amount of times it is seen within a predetermined time period, across a predetermined number of devices or formats, reduces or prevents ad fatigue.

For example, traditionally as user is shown the same ad with the same parameters across many formats within a time period and therefore may see the same ad several times a day for several days. Although the user may have been engaged the first time or even a few times they watched the ad, the user may well skip the ad every time thereafter once the user has seen it many times and ultimately not be influenced or interested by the ad.

By limiting the amount of times a user sees the preferred ad parameters, interest is retained, particularly once the preferred parameters are determined and shown. Once a pattern of parameters has been shown to the user, a timer is initiated such that the same ad having the same set of parameters is not shown to the user again within a predetermined time period/until all other combinations of parameters have been shown and the user's reaction recorded.

Figure 5:
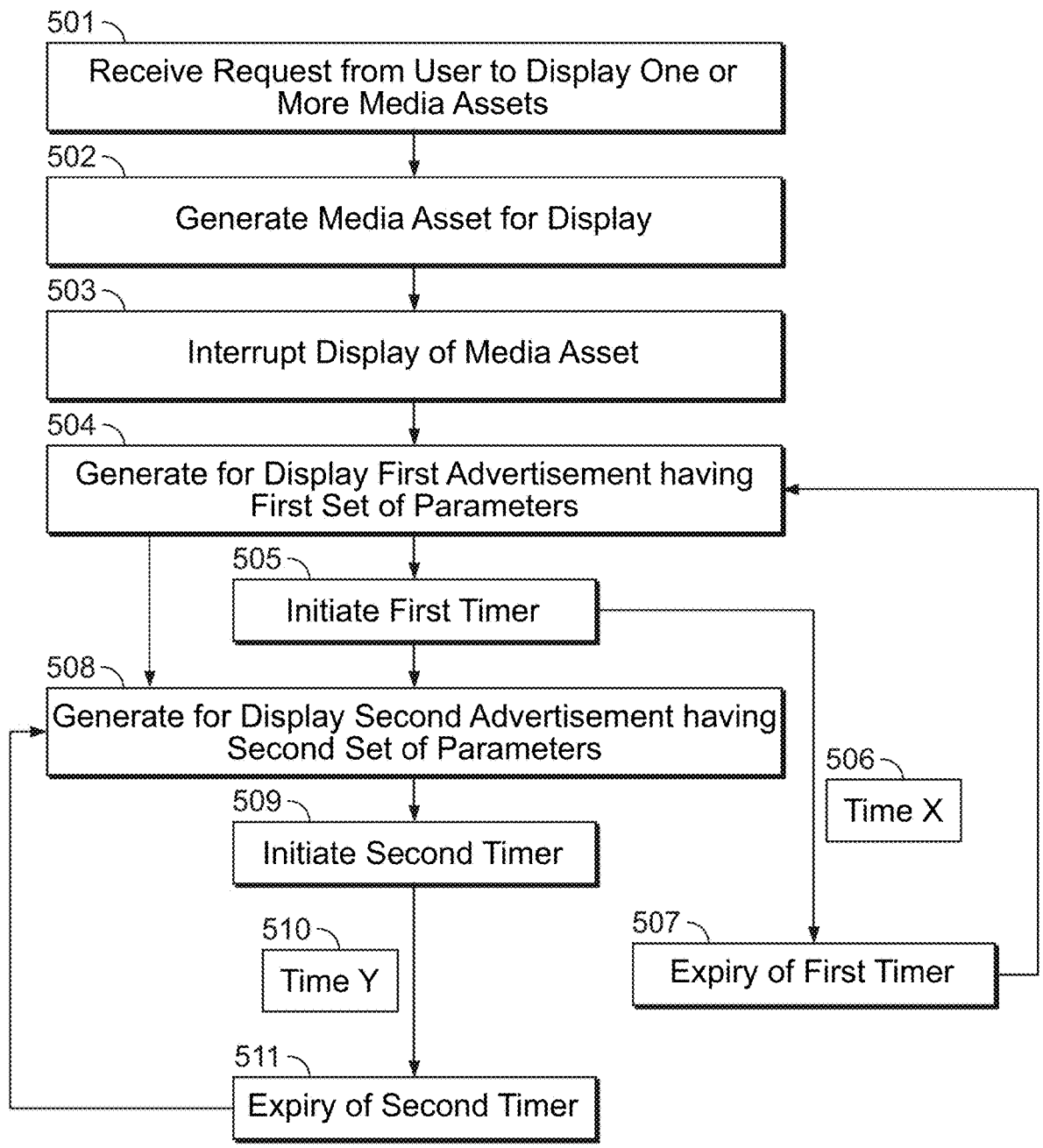
FIG. 5 depicts an illustrative flowchart of a process for ensuring more than one ad is not displayed too frequently.

FIG. 5 is an illustrative flowchart of a process for ensuring an ad is not shown to the user again within a predetermined time period. After receiving a request from a user to display one or more media assets 501, and generating a media asset for display 502, interrupting the display of the media asset 503 and generating for display an ad having a set of parameters 504, initiating a timer 505 which runs for a predetermined time period (time x; 506), and the ad may be generated again 406 only after the expiry of the timer 507, the exemplified method further comprises, after generating a second ad having a second set of parameters 508, initiating a second timer 509 such that the second ad having the second set of parameters is not generated again within a second predetermined time period, time y 510, on at least one media platform or an any media platform until the expiry of the second timer 511. Time x and time y may be a time period of the same length or may be different length time periods.

A timer may be initiated to prevent an ad having a set of parameters being displayed again within a predetermined time period, in order to reduce or prevent ad fatigue. Once the preference of the user has been determined and stored, the advert with the preferred set of parameters is displayed again only after the timer has expired. The timer may be for 1 hour, 6 hours, 12 hours or 24 hours. The timer may be for 1 day, 2 days, 3 days or 7 days. The timer may be for 1 week, 10 days, 2 weeks or one month. It may be across all and any media platforms such that the advert is not displayed to the user at all within the time period set by the timer. The timer may only be active for one or more media platforms, such as live TV, such that when the user is watching live TV the ad having the preferred parameters is not displayed, but on social media an ad having the preferred set of parameters is displayed.

The timer may be initiated for all ads having any of a plurality of sets of parameters, (i.e., not only the preferred set). In this embodiment, a first ad having a first set of parameters will not be shown again until the timer has expired, the timer running from the time point at which the first ad is displayed. A second ad having a second set of parameters will not be shown again until a second timer has expired, the second timer running from the time point at which the second ad is displayed.

FIG. 6A shows an example in which the first ad and the second ads may generated at different time points within the same media asset. The media asset starts 601, and after part of the media asset has been displayed, the first ad is displayed 602. The media asset continues 603 and after a further part of the media asset has been displayed, the second ad is displayed 604. Further parts of the media asset are displayed, 605 and 607, interrupted by the third ad 606.

FIG. 6B shows an example where the first ad 608 is displayed in a first media asset 609 and a second ad 610 is displayed in a second media asset 611. The first and second media assets may be different TV shows or different assets on different media platforms.

As shown in FIG. 6C the first ad 612 and the second ad 613 may be shown on different days, such as sequential days (e.g., Monday and Tuesday, respectively), within different episodes (media asset 614 and media asset 615) of the same TV show. The media guidance application may display the first and second ads in the same media asset at different time points, or in different media assets. The different media assets may be different episodes of the same TV series, which may be sequential episodes of the same TV series.

The different media assets may be on different media platforms, e.g., the first ad may be shown during a TV show and the second ad may be shown on social media. If the first and second ads are shown in the same media asset, such as a TV show, the first ad may be displayed, for example, after 10 minutes of display of the TV show and the second ad may be displayed after 20 minutes of display of the same TV show episode. For example, the media guidance application may display the first and second ads having first and second sets of parameters in an episode of a TV series at one or more points during the TV show.

Figure 7:
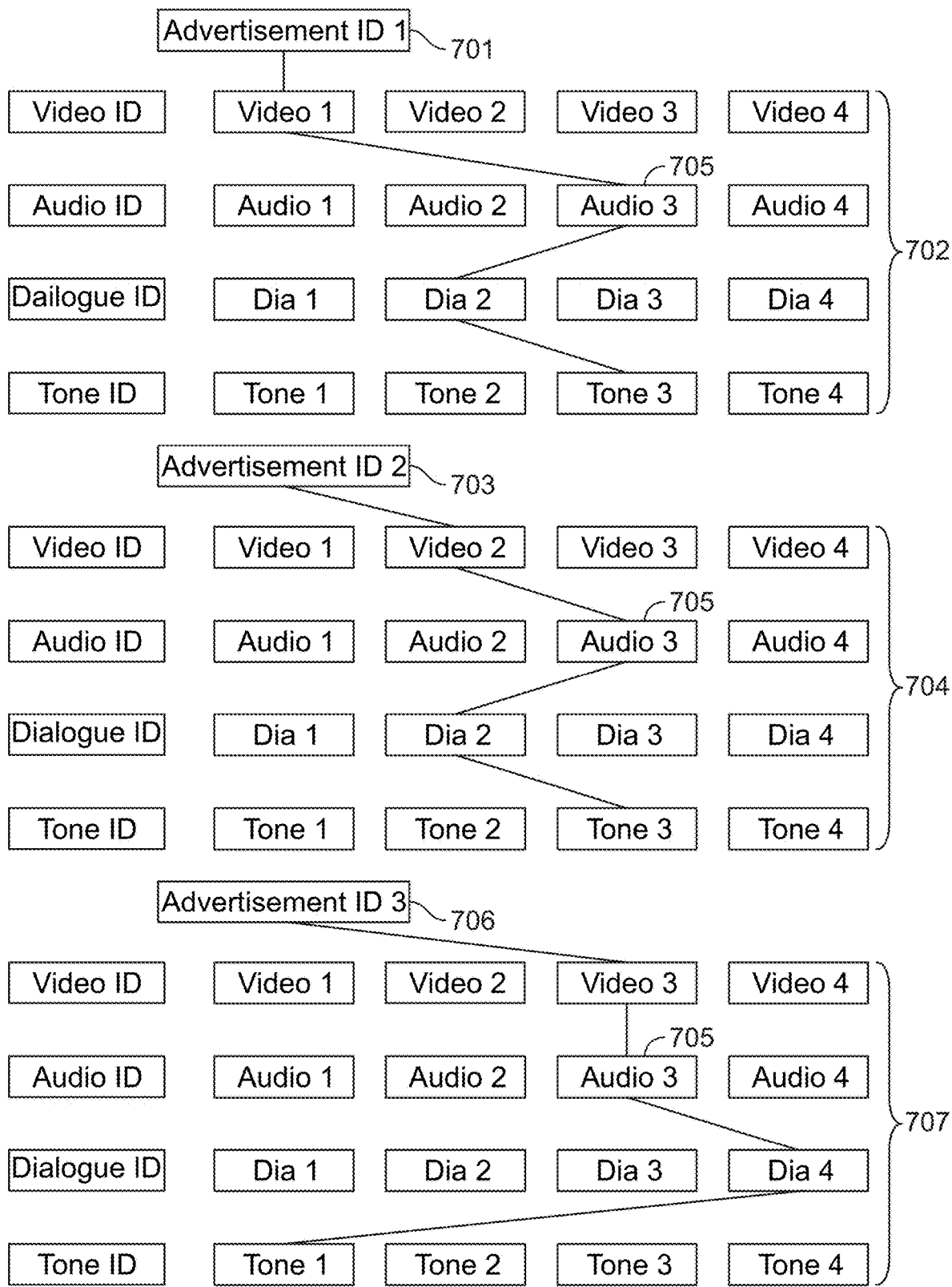
FIG. 7 depicts schematically how different ads have different sets of parameters.

FIG. 7 shows a first ad 701 having a first set of parameters 702 and the second ad 703 having the second set of parameters 704. The second ad may comprise the same parameter relating to an audio track (audio 3; 705) and the parameters relating to video, dialogue or tone may differ between the first and second ads, but the audio parameter is the same in the first and second ads. FIG. 7 shows an example where a third ad 706, having a third set of parameters 707, includes the same parameters relating to an audio track (audio 3; 705) but a different video, dialogue and tone track to both the first ad 701 and the second ad 703. The first ad and second ad may have the same visual/video and the first set of parameters and second set of parameters may provide different audio, such as a different combination of music track, dialogue, voiceover, tone.

User data is maintained for any given set of parameters. Each set of parameters comprises a number of individual parameters, and the plurality of sets of parameters is determined from a matrix of the individual parameters. The viewed or skipped status of each ad having a set of parameters, i.e., each unique combination of individual parameters selected from the matrix, is maintained in a server.

The user profile may be updated with information on each set of parameters, which enables the determination of preferred individual parameters. Parameters include genre, domain, product classification, audio track (e.g., music), dialogue track (e.g., scripts spoken by actors within the ad), voiceover tracks (separate from dialogue), video track (e.g., different videos may be used for the same product), tone (whether the ad is e.g., comedic, serious, factual), pitch (e.g., high pitch, fast or slow paced, typical female or male voice). Some preferred parameters may be able to be determined from a user profile for e.g., movies, other parameters are learned.

The first ad and the second ad may differ by only one parameter, e.g., such as the music track, or the dialogue or voiceover track. The first ad and second ad may differ by more than one parameter, such as two, three, four, five or six parameters.

Figure 8:
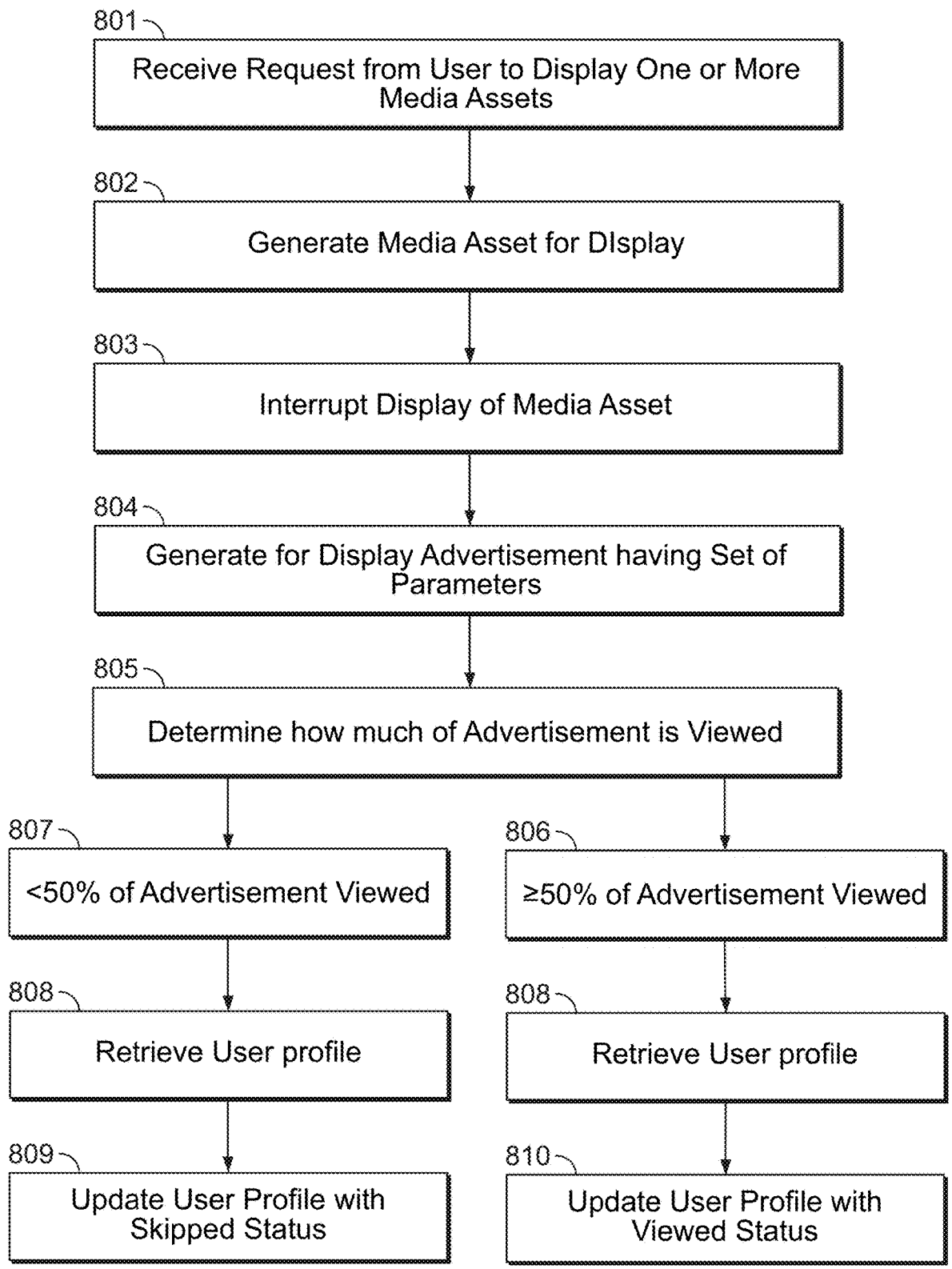
FIG. 8 depicts an illustrative flowchart of a process for determining whether an ad is viewed or skipped by a user.

FIG. 8 is a flowchart illustrating an example of receiving a request from a user to display one or more media assets 801, generating the media asset for display 802, interrupting the display of the media asset 803 and generating for display an ad having a set of parameters 804. It is determined how much of the ad is viewed 805. The ad is determined to have been greater than or equal to 50% viewed 806 or less than 50% viewed 807. The user profile is retrieved 808 and updated to show the ad is skipped if less than 50% is viewed 809 and updated as viewed if at least 50% of the ad is viewed 810.

In other embodiments, the ad may be determined as viewed if at least 90%, 80%, 70%, 60%, 40%, 30%, 20% or 10% of the ad is viewed. By viewed it is meant how much of the ad is displayed/played before being skipped or fast forwarded. The ad may be determined as skipped if the user views less than 10%, less than 20%, less than 30%, less than 40%, less than 50%, less than 60% or less than 70% of the ad. The method of the invention may use a 'percent viewed' threshold to determine whether the ad is viewed or skipped. For example, an ad may be determined as viewed when the user has watched 50% of the ad, even if the user skips the remaining 50% of the ad. Alternatively, the ad may be determined as viewed only if the user views the complete ad, i.e. 100% of the ad. The ad may be determined as skipped if the user views less than 50% of the ad. Or it may be determined as skipped if the user views less than 25% or less than 10% of the ad.

The media guidance application may compare the percent viewed of the first and second ads, even if both do not reach the percent viewed threshold, i.e. even if they are both determined as skipped. For example, the first ad may be 45% viewed by the user, and the second ad may be 25% viewed by the user. The media guidance application may determine both ads as skipped and that the first set of parameters and the second set of parameters are each not preferred by the user and update the user profile accordingly. Or the media guidance application may determine that the first set of parameters is preferred over the second set, and update the user profile accordingly.

The present invention also relates to a system for reducing or preventing ad fatigue, comprising communications circuitry, and control circuitry configured to receive a request from a user to display a media asset; based on receiving the request, generate the media asset for display; based on generating the media asset for display, interrupt the display of the media asset and generate for display a first ad having a first set of parameters; determine whether the user views or skips the first ad; retrieve a user profile; based on the determining whether the user views or skips the first ad, update a user profile with a viewed or skipped status; based on the updated user profile, determining whether the user will view a second ad having a second set of parameters; and based on determining that the user will view the second ad, generate the second ad for display.

The system may comprise (a) first metadata that associates a plurality of different sets of parameters with an ad and (b) second metadata that associates a status with each set of parameters; means for associating a set of parameters with an ad each time the ad is displayed; means for receiving the ad from the media server; means for determining the status of the ad, wherein the status is whether a user of the device has viewed or skipped the ad.

The control circuitry may also be further configured to determine whether the user views or skips the second ad; to retrieve a user profile; based on the determining whether the user views or skips the second ad, to update a user profile with a viewed or skipped status; based on the updated user profile, to determine whether the user will view a further ad having a further set of parameters; and based on determining that the user will view the further ad, to generate the further ad for display. The control circuitry may be further configured, based on a user profile, to determine whether the first set of parameters needs to be updated prior to display; based on the determining from a user profile, determine user viewing history data; based on the user viewing history data, determine whether the user viewed the media asset; and based on determining that the user previously viewed the media asset, update the first ad. The control circuitry may be further configured to, based on the determining that the user has not previously viewed the media asset, randomly generate a first ad having a first set of parameters for display. The control circuitry is further configured to determine the ad as viewed if the user views at least 50% of the ad.

The system of the invention may also comprise control circuitry that is further configured to, when generating a second ad having a second set of parameters based on the updated user profile, generate a second ad having a second set of parameters that differs by at least one parameter from the first ad having a first set of parameters. The control circuitry may also be configured, after generating a first ad having a first set of parameters, to initiate a timer such that the first ad having the first set of parameters is not generated again within a predetermined time period on at least one media platform or any media platform. The timer may also be initiated by the system in respect of the generation of the second ad having a second set of parameters, such that the second ad having the second set of parameters is not displayed again within a predetermined time period on at least one media platform, or any media platform.

The control circuitry of the system may be further configured, after generating the media asset, to generate the first ad and the second ad at different time points within the same media asset.

The invention also provides a system for reducing or preventing ad fatigue, the system comprising: means for storing (a) first metadata that associates one of a plurality of different sets of predetermined parameters with an ad and (b) second metadata that determines whether the ad having a set of parameters has been displayed; means for displaying a different ad having a different set of parameters each time an ad displayed within a predetermined time period; means for determining whether a user has viewed or skipped the generated ad; and means for storing in a user profile whether the user has viewed or skipped the displayed ad; means for updating the user profile; and means for selecting a set of parameters that matches the user profile.

A non-transitory machine-readable medium is also provided, comprising memory with instructions encoded thereon for reducing or preventing ad fatigue, the instructions comprising instructions for receiving a request from a user to generate a media asset for display based on receiving the request, generating instructions for interrupting the media asset to generate a first ad having a first set of parameters for display.

In some embodiments, the media guidance application may determine that the parameters of the ads to be displayed in the media asset need to be updated. For example, the media guidance application may determine after a length of time has passed, that the ads and/or one or more parameters are old or irrelevant to the user, either due to referring to past events or now irrelevant content or because the user's preferences have changed, as determined by skipping ads having previously viewed parameters, and updating the user profile.

In some embodiments, the media guidance application may determine that the generated ad having the set of parameters is different based on the time of day (e.g., a different response from the user is determined to the same ad having the same set of parameters for the morning, afternoon, evening, and night). The media guidance application may generate an ad having a set of parameters, based on a user profile, depending on the time of day the request to display a media asset from the user is received. The different set of parameters based on the time of day may be chosen based on the user profile, or updated user profile. For example, the media guidance application may determine, from the user profile that the user tends to view ads with at least one cooking related parameters in the morning and afternoon, but not at night; at night the user tends to skip ads with at least one cooking related parameter. The media guidance application may then generate an ad having a set of parameters that comprises at least one cooking-related parameter when the request to display a media asset is received during the morning or afternoon. Likewise, when the media guidance application receives a request from the user to display a media asset during the evening or night, the media guidance application may generate an ad having a set of parameters that are not related to cooking.

Based on generating the media asset at the request of the user, the media guidance application may determine, based on the user profile, whether an ad needs to have a specifically selected set of parameters or a randomly selected set of parameters. For example, the media guidance application may determine that an ad's parameters (e.g., an ad for a fitness and step tracker) needs to be updated based on an updated user profile (e.g., fitness ads are almost always skipped by the user regardless of the set of parameters the ads have) but the user profile indicates the user has started watching more sports. Generating an ad having a set of parameters related to sports or fitness may be displayed to the user to determine if the preference has changed.

In some embodiments, when based on interrupting the media asset to generate a first ad having a first set of parameters, the media guidance application may determine, based on the user profile, whether the first set of parameters needs to be updated. The media guidance application may retrieve, from a user profile, user viewing history data. For example, the media guidance application may retrieve the user's viewing history data (e.g., a list of media content the user has previously viewed) from the user profile in order to generate a set of parameters that may be likely to match with the user profile and lead to the user viewing the ad, rather than skipping the ad, allowing more quickly for the media guidance application to determine a set of parameters preferred by the user.

In some embodiments, the media guidance application may determine, from a user profile, if the user previously viewed the ad, and if so, with which set of parameters. If the user previously viewed the ad, updating the ad with a new, un-displayed set of parameters may enable the user profile to become more accurate in terms of the user preferences relating to the viewed or skipped status of the ad having the set of parameters.

In some embodiments, the media guidance application may determine from the user profile, whether the set of parameters of the ad needs to be updated to ensure parameters such as dialogue and video are kept up-to-date. The media guidance application may update the sets of parameters after they have reached a certain age. This allows a set of parameters of an ads displayed in the media asset to be recent and relevant to the user, e.g., and not relating to an event or time already passed.

In some embodiments, the media guidance application may generate for display an ad having a set of parameters based on user input. For example, the media guidance application may generate a prompt with selectable choices (e.g., an overlay to be displayed on user equipment 100) that allows the user to choose whether the types of ads that are displayed are recorded as watched or skipped. For example, the media guidance application may generate a prompt (e.g., "may we store information on which ads you watch or skip?") with selectable choices (e.g., "yes" "no"). Based on the choices the user selects (e.g., using a remote controller, a mouse, etc.), the media guidance application may or may not update the user profile with a viewed or skipped status.

The media guidance application may compare an ad having a set of parameters with the user profile. For example, the media guidance application may determine based on the methods described above that the user is likely to skip any ad related to sports or fitness, or likely to view any ad relating to fashion or shopping. The media guidance application may compare the displayed ad having a set of parameters (e.g., the content description from the metadata for the ad) with the user profile and determine the set of parameters to display that matches the user profile, e.g., at least one of the parameters (e.g., video, dialogue, voiceover) needs to be shopping-related.

The media guidance application may determine, from the comparison, whether at least one of the parameters of the set of parameters of the displayed ad matches the user profile. For example, the media guidance application may determine, from the comparison, that the ad (e.g., the metadata may indicate that the ad is for the Olympics) does not meet the user profile but at least one of the parameters of the ad may be e.g., shopping-related (dialogue relating to Olympics merchandise), and therefore the media guidance application may generate for display the ad having a particular set of parameters likely to be viewed by the user.

The invention also includes a system for reducing ad fatigue by updating an ad in a media asset with a user's preferences, comprising communications circuitry; and control circuitry configured to receive a request from a user to display one or more media assets; generate the media asset for display; interrupt the display of one or media assets to generate a first ad having a first set of parameters for display; determine whether user watches or skips the first ad; update the user profile based on whether the user watches or skips the first ad; select a second ad having a second set of parameters for display based on the updated user profile.

It will be appreciated that other features, aspects and variations of the present invention will be apparent from the disclosure herein of the drawings and detailed description. Additionally, it will be further appreciated that additional or alternative embodiments may be implemented within the principles set out by the present disclosure.

What is claimed is:

1. A method for generating targeted adverts, comprising:
   generating first metadata for a first advert for a product or service, the metadata comprising a first set of parameter values for respective parameter types;
   generating for display a first advert for the product or service based on the first metadata; determining from a user's interactions with the device on which the first advert is displayed whether a user decided to consume the first advert for the product or service;
   updating a user profile in dependence upon whether the user decided to consume the first advert for the product or service;
   in response to the user deciding not to consume the first advert for the product or service, generating second metadata for a second advert for display, the second advert advertising the same product or service, the second metadata comprising a second set of parameter values for the respective parameter types, the second set of parameter values differing from the first set of parameter values and being selected in dependence upon the updated user profile;
   generating for display a second advert for the product or service based on the second metadata;
   in response to the second set of metadata reaching a threshold age, generating third metadata for a third advert for the same product or service, the third metadata comprising a third set of parameter values for the respective parameter types; and generating for display a third advert for the product or service.

2. The method of claim 1, further comprising:
determining from the user's interactions with the device on which the second advert is displayed, whether a user decides to consume the second advert for the product or service;
further updating the user profile in dependence upon whether the user decided to consume the second advert for the product or service;
in response to the user deciding not to consume the second advert for the product or service, generating fourth metadata for a fourth advert for display, the fourth advert advertising the same product or service, the fourth metadata comprising a fourth set of parameter values for the respective parameter types, the fourth set of parameter values differing from both the first and second sets of parameter values and being selected in dependence upon the further-updated user profile; and
generating for display a fourth advert for the product or service based on the fourth metadata.

3. The method of claim 1, wherein some of the first set of parameter values are retrieved from a pre-existing user profile, and others of the first set of parameter values are learned from whether a user decided to consume adverts previously displayed to the user.

4. The method of claim 1, wherein each advert comprises a composition of recorded elements, each parameter type corresponding to a type of recorded element, and each parameter value corresponding to a different version of the type of recorded element.

5. A system for generating targeted adverts, comprising:
communications circuitry; and
control circuitry configured to:
generate first metadata for a first advert for a product or service, the metadata comprising a first set of parameter values for respective parameter types;
generate for display a first advert for the product or service based on the first metadata;
determine from a user's interactions with the device on which the first advert is displayed whether a user decided to consume the first advert for the product or service;
update a user profile in dependence upon whether the user decided to consume the first advert for the product or service;
in response to the user deciding not to consume the first advert for the product or service, generate second metadata for a second advert for display, the second advert advertising the same product or service, the second metadata comprising a second set of parameter values for the respective parameter types, the second set of parameter values differing from the first set of parameter values and being selected in dependence upon the updated user profile;
generate for display a second advert for the product or service based on the second metadata;
in response to the second set of metadata reaching a threshold age, generating third metadata for a third advert for the same product or service, the third metadata comprising a third set of parameter values for the respective parameter types; and generating for display a third advert for the product or service.

6. The system of claim 5, wherein the control circuitry is further configured to:
determine from the user's interactions with the device on which the second advert is displayed, whether a user decides to consume the second advert for the product or service;
further update the user profile in dependence upon whether the user decided to consume the second advert for the product or service;
in response to the user deciding not to consume the second advert for the product or service, generate fourth metadata for a fourth advert for display, the fourth advert advertising the same product or service, the fourth metadata comprising a fourth set of parameter values for the respective parameter types, the fourth set of parameter values differing from both the first and second sets of parameter values and being selected in dependence upon the further-updated user profile; and
generate for display a fourth advert for the product or service based on the fourth metadata.

7. The system of claim 5, wherein some of the first set of parameter values are retrieved from a pre-existing user profile, and others of the first set of parameter values are learned from whether a user decided to consume adverts previously displayed to the user.

8. The system of claim 5, wherein each advert comprises a composition of recorded elements, each parameter type corresponding to a type of recorded element, and each parameter value corresponding to a different version of the type of recorded element.

\* \* \* \* \*